No. 741,222. PATENTED OCT. 13, 1903.
W. CAMERON.
CAN SOLDERING MACHINE.
APPLICATION FILED APR. 16, 1903.
NO MODEL. 2 SHEETS—SHEET 1.
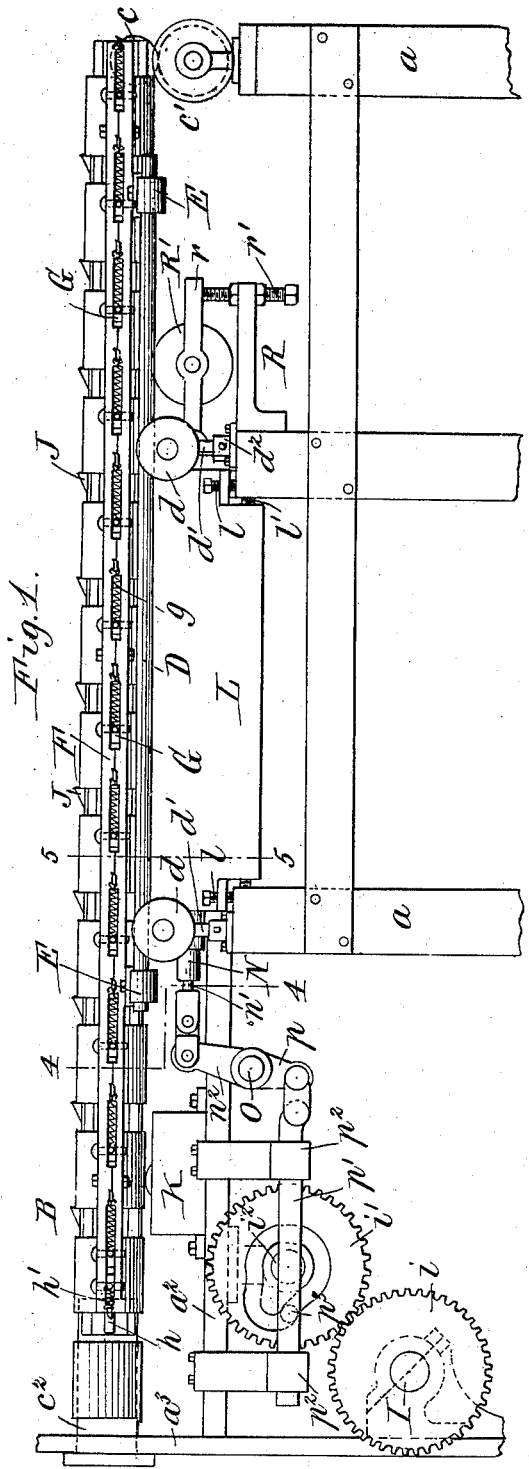
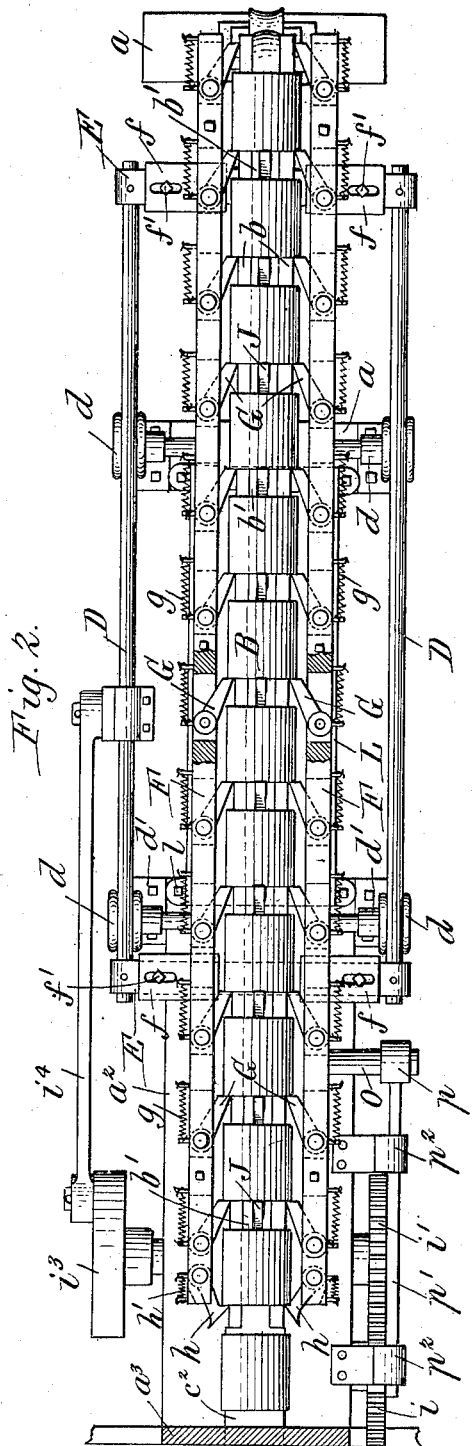
Witnesses: William Cameron Inventor.
By Wilhelm Bonner Attorneys.

No. 741,222. PATENTED OCT. 13, 1903.
W. CAMERON.
CAN SOLDERING MACHINE.
APPLICATION FILED APR. 16, 1903.
NO MODEL. 2 SHEETS—SHEET 2.
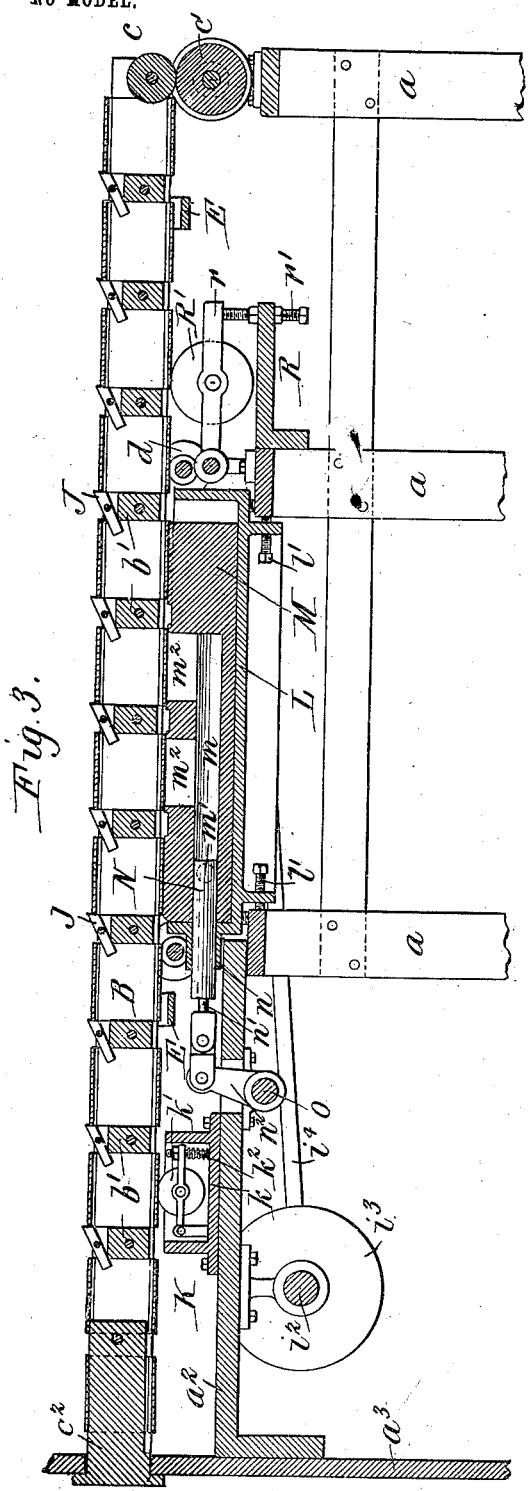
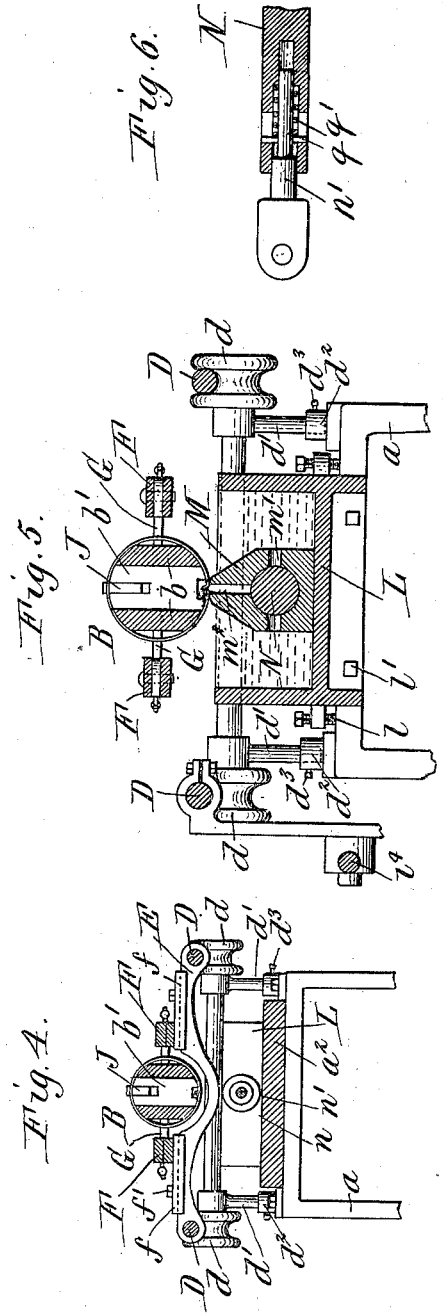
Witnesses:
R. W. Rumser
E. A. Volk
William Cameron
Inventor.
By Wilhelm Bonner
Attorneys.

No. 741,222. Patented October 13, 1903.

UNITED STATES PATENT OFFICE.

WILLIAM CAMERON, OF CHICAGO, ILLINOIS.

CAN-SOLDERING MACHINE.

SPECIFICATION forming part of Letters Patent No. 741,222, dated October 13, 1903.

Application filed April 16, 1903. Serial No. 152,867. (No model.)

*To all whom it may concern:*

Be it known that I, WILLIAM CAMERON, a citizen of the United States, residing at Chicago, in the county of Cook and State of Illinois, have invented new and useful Improvements in Can-Soldering Machines, of which the following is a specification.

This invention relates to a machine for soldering the side or longitudinal seams of can-bodies and is of that type in which the can-bodies are fed or conveyed horizontally over a body of molten solder with their seam sides down and the solder is applied to the seams from said body of solder.

The object of the invention is to provide an efficient can-soldering machine of simple construction, having reliable means for raising the level of the body of molten solder at a point beneath the seams of the cans into contact with the seams.

In the accompanying drawings, consisting of two sheets, Figure 1 is a side elevation of a can-soldering machine embodying the invention. Fig. 2 is a top plan view thereof. Fig. 3 is a vertical longitudinal sectional elevation thereof. Fig. 4 is a transverse section thereof in line 4 4, Fig. 1. Fig. 5 is a transverse section thereof, on an enlarged scale, in line 5 5, Fig. 1. Fig. 6 is a detail section, on an enlarged scale, of the yielding connection between the solder-plunger and its operating-rod.

Like letters of reference refer to like parts in the several figures.

The main frame of the machine may be of any suitable construction adapted to support the operating parts of the machine. The frame shown consists of upright transversely-arranged standards $a$, which are preferably connected by suitable horizontal rails or bars, and a horizontal bed $a^2$, which is supported at its front end by the rear standard $a$ and at its rear end by a frame or standard $a^3$, which is a part of the frame of the can-body-forming machine in connection with which the soldering-machine is used. The soldering-machine, however, may be operated independently of a body-forming machine.

B represents the horn of the soldering-machine, or the horizontal support which the can-bodies surround and along which they are conveyed or fed past the soldering device. The horn shown consists of two parallel bars $b$, which are spaced by blocks $b'$, arranged at intervals between the bars, which latter are connected by bolts passing through the same and the spacing-blocks $b'$. The horn is supported at its front end preferably by a roller $c$, journaled between the front ends of the horn-bars and resting upon the circumference of a roller $c'$, journaled in bearings on the front standard $a$. The rear end of the horn is supported by and detachably connected to the front end of the part $c^2$, which constitutes the forming-horn or mandrel of the can-body-forming machine and which is secured to the frame $a^3$ of the forming-machine. The can-bodies, as usual, are fed horizontally forward from the forming-horn onto the soldering-horn and pass off of the front end of the latter between the rollers $c\,c'$, which support the front end of the soldering-horn. The horn may be constructed and supported in any other suitable manner.

The can-bodies are fed or conveyed longitudinally along the soldering-horn by any suitable conveyer. The conveyer shown in the drawings is constructed and operated as follows:

D represents two horizontal rods which are arranged at opposite sides of and parallel with the horn. The rods are preferably cylindrical and are supported on grooved rollers $d$, journaled on shafts supported by brackets $d'$, which are preferably adjustable vertically, for which purpose they are vertically movable in sockets $d^2$ on the standards $a$ of the main frame and are secured in the position to which they are adjusted by set-screws or the like, $d^3$. This manner of supporting the rods enables the latter to be adjusted vertically to the proper position relative to the horn or to horns of different diameter. The conveyer-bars are rigidly connected at or near their front and rear ends by yokes E, which are provided with downwardly-bent or depressed central portions passing under the soldering-horn.

F represents feed-bars which are secured to blocks $f$, which rest upon horizontal side portions of the yokes E, upon which they are adjustable transversely to properly position the feed-bar relative to the soldering-horn or to soldering-horns of different diameters.

The blocks are secured when adjusted by bolts $f'$, which pass through elongated slots in the blocks and engage in threaded holes in the yokes. Each feed-bar preferably consists of an upper and lower strip secured together, the adjacent faces of the strips being slotted to provide openings for pivoted feed-dogs G. Each feed-bar is provided with a series of these feed-dogs which are pivoted at their outer ends in the openings in the feed-bar and project inwardly and forwardly therefrom. The inner ends of the dogs are yieldingly pressed toward the horn, so as to engage the rear ends of the can-bodies, by suitable springs $g$, connected at their opposite ends to pins secured to the dogs and to the feed-bars. Each feed-bar is also provided at its rear end with hooked pivoted stripping-fingers $h$, which are pressed toward the horn by springs $h'$ and which are adapted to engage the rear end of the can-body on the forming-horn and remove the same from the forming-horn, leaving it in a position to be engaged by the first set of feed-dogs.

The conveyer-frame, consisting of the bars D and yokes E, is reciprocated to feed the can-bodies along the horn as follows: I represents a drive-shaft which is driven by suitable means (not shown) and is journaled transversely of the machine in bearings on the standard $a^3$. The drive-shaft is provided with a gear-wheel $i$, which meshes with and drives a gear-wheel $i'$, secured to a counter-shaft $i^2$, journaled in bearings depending from the bed $a^2$ of the machine. The counter-shaft is provided at one end with a crank-disk $i^3$, the wrist-pin of which is connected by a pitman $i^4$ to a stud projecting from the adjacent side rod D of the conveyer-frame. When the conveyer-frame is moved forwardly, the pivoted dogs on the feed-bars engage the rear ends of the can-bodies and move the same forwardly one step on the horn. When the conveyer-frame is moved rearwardly, the dogs yield and pass the can-bodies. In order to hold the can-bodies from rearward movement on the horn, by reason of the pressure of the feed-dogs against the bodies in their rearward movement, the horn is provided with a series of retaining-dogs J, which are preferably pivoted intermediate of their ends in recesses in the upper portions of the spacing-blocks $b'$ of the horn. The rear ends of the holding-dogs are weighted sufficiently to hold their front ends up above the top of the horn. When the can-bodies are moved forwardly, they pass over the retaining-dogs, which yield, and when their rear ends clear the dogs the front ends of the dogs are raised by their weighted rear ends and engage the rear ends of the can-bodies.

K represents the acid or flux applying device, consisting of an acid pot or receptacle $k$, supported by the bed $a^2$, and an acid-wheel $k'$, which dips into the acid or flux in the receptacle and applies the same to the can-body seams as the bodies pass over the acid-wheel. The wheel is journaled on a pivoted lever, which is adjusted to cause the wheel to bear with the proper pressure against the seam, by an adjusting-screw $k^2$. Any other suitable means for applying the acid or flux to the seams may be employed.

L represents the solder box or receptacle, which is arranged beneath the horn in front of the aciding device and contains a body of solder which is kept in a molten condition by any suitable heating means. (Not shown.) The solder-receptacle is preferably of rectangular form and is supported on the standards $a$ of the main frame by suitable adjusting-screws $l$, which pass through threaded holes in lateral lugs on the solder-receptacle and bear on the tops of the standards $a$. By adjusting the screws $l$ the solder-receptacle can be raised or lowered to the proper elevation relative to the soldering-horn. The solder-receptacle is also preferably provided at each end with horizontal adjusting-screws $l'$, which pass through threaded holes in depending flanges on the solder-receptacle and abut against the vertical faces of the standard. These screws prevent longitudinal movement of the solder-receptacle and enable the same to be fixed in the correct position longitudinally of the soldering-horn.

M represents the soldering iron or device for applying the solder to the can-seams. The soldering-iron is arranged in the solder-receptacle beneath and parallel with the soldering-horn, and when the machine is in operation the soldering-iron is nearly entirely submerged in the molten solder. Its top edge or face, which projects slightly above the top of the solder-receptacle, is narrow and preferably convexed or rounded slightly, so that the solder will not stand thereon, and the upper portion of the soldering-iron is preferably tapered, as shown in Fig. 5. The soldering-iron is provided in its rear portion with a longitudinal solder-chamber $m$. The latter communicates with the solder-receptacle by means of one or more lateral solder-inlet holes $m'$ in the rear end portion of the soldering-iron, so that the molten solder can pass through said holes into the solder-chamber in the iron. The soldering-iron is also provided in its upper portion with one or more (preferably a plurality) elongated narrow slots $m^2$, which extend through the upper portion of the iron and connect with the solder-chamber $m$. Each of these slots is preferably somewhat shorter than the length of a can-body, and they are so positioned in relation to the horn and conveyer that when the can-bodies are stationary the upper end of each slot is covered and closed by a can-body.

N represents a plunger which fits and is adapted to reciprocate in the rear end portion of the solder-chamber in the soldering-iron. When the plunger is moved rearwardly, it uncovers the solder-inlet holes $m'$, so that the solder enters the solder-chamber in the iron and rises in the latter and slots $m^2$ until it reaches the level of the solder in the receptacle. When the plunger is moved forwardly, it closes the solder-inlet holes $m'$ and forces the solder in the chamber up through the slots in the top of the soldering-iron and against the seams of the can-bodies located above said slots, thus applying solder to the seams. The solder is applied simultaneously to several seams, and as the bodies are only moved from one slot to the next at each forward movement of the conveyer the solder is applied at each seam two or more times, according to the number of slots in the soldering-iron and the number of reciprocations of the plunger. This insures a perfect soldering of each seam. The plunger may be reciprocated in any suitable manner. In the construction shown the plunger passes through a bearing-box $n$ on the rear end of the solder-receptacle and is connected by an operating-rod $n'$ to the upper end of an arm $n^2$, secured to a rock-shaft O, which is journaled in suitable bearings depending from the bed of the machine. The rock-shaft is provided at one end with a rock-arm $p$, which is connected to a slide $p'$, mounted to reciprocate horizontally in suitable bearings $p^2$, depending from the bed of the machine. The slide is provided with a stud or roller $p^3$, which enters a cam-groove in the face of the gear-wheel $i'$, secured to the counter-shaft $i^2$. The slide is reciprocated by the cam-groove and through the described connections reciprocates the solder-plunger. The movements of the plunger are so timed that the plunger is moved forwardly to force the solder up through the slots in the soldering-iron against the seams of the can-bodies only when the latter are stationary and occupy positions over said slots, and the plunger can be reciprocated once for each one, two, or more movements of the conveyer, as found most expedient. As the slots are shorter than the lengths of the can-bodies, as before explained, the slots are completely closed by the bodies and no solder enters the interiors of the can-bodies. If any solder is forced out sidewise between the soldering-iron and the can-bodies, it will flow down the tapered upper portion of the iron into the solder-receptacle.

In order to prevent undue pressure on the solder in the chamber of the soldering-iron and to lessen the possibility of the solder being forced out between the can-bodies and the soldering-iron, the operating-rod for the plunger has a yielding connection with the stem of the plunger. The stem of the plunger is provided in its outer end with a longitudinal hole. The end of the connecting-rod enters the hole in the outer end of the plunger-stem and is provided with a cross-pin $q$, working in elongated slots in the plunger-stem. A coiled spring $q'$ is arranged in the hole in the plunger-stem and abuts at one end against the end of said hole and at its other end against the cross-pin of the connecting-rod. By this arrangement the plunger is moved forwardly through the medium of the spring and is adapted to yield and is moved rearwardly by the engagement of the cross-pin of the connecting-rod with the ends of the slots in the plunger-stem. A yielding connection between the plunger and its operating means may be effected in any other suitable manner.

The forward end of the soldering-iron is preferably solid and acts to sweat the solder into the seams; but a separate sweating-iron can be used, if desired or found necessary.

R represents the burnisher or device for wiping and burnishing the solder on the seams after the bodies leave the soldering device. The burnisher shown consists of a wheel R', of suitable material, journaled on a pivoted lever $r$, which is adjusted to press the wheel against the can-body by an adjusting-screw $r'$. Any other means for this purpose may be employed.

I claim as my invention—

1. In a can-soldering machine, the combination of a support for the can-body, a body of molten solder, a soldering-iron provided with a solder-chamber and an opening in communication with the body of molten solder and in which the solder is held normally out of contact with the seam of the can-body, and a plunger working in said solder-chamber to force the solder through said opening into contact with the seam of the can-body, substantially as set forth.

2. In a can-soldering machine, the combination of a support for the can-body, a body of molten solder, a soldering-iron provided with a solder-chamber and with one or more openings in communication with the body of molten solder and in which the solder is held normally out of contact with the seam of the can-body, and a plunger working in said solder-chamber and which intermittently forces the solder through said opening or openings into contact with the seam of the can-body, substantially as set forth.

3. In a can-soldering machine, the combination of a support for the can-body, a body of molten solder arranged beneath said support, a soldering-iron arranged beneath said support in said body of solder, said soldering-iron having a solder-chamber, and a slot in its upper portion communicating with said solder-chamber, an inlet-opening for the solder connecting with said solder-chamber, and a plunger working in said solder-chamber and acting to force the solder up through said slot into contact with the seam of the can, substantially as set forth.

4. In a can-soldering machine, the combination of a support for the can-bodies, a body of molten solder arranged beneath said support, a soldering-iron arranged in said solder beneath said support and provided with a longitudinal solder-chamber and with a series of slots extending through the upper portion of said soldering-iron and communicating with said solder-chamber, an inlet-opening for the solder connecting with said solder-chamber, and a reciprocating plunger working in said solder-chamber and acting to force the solder through said slots into contact with the seams of the can-bodies, substantially as set forth.

5. In a can-soldering machine, the combination of a support for the can-bodies, a solder-receptacle arranged beneath said support, a soldering-iron arranged beneath said support in said solder-receptacle, and having a solder-chamber and a slot communicating with said solder-chamber, said iron having an inlet-opening for the solder communicating with said solder-chamber and with said solder-receptacle, and a plunger working in said solder-chamber and acting to open and close said inlet-opening and force the solder through said slots into contact with the seam of the can-body, substantially as set forth.

6. In a can-soldering machine, the combination of a support for the can-body, a body of molten solder, a soldering-iron provided with a solder-chamber, a slot communicating with said chamber, and an inlet-opening for the solder connecting with said solder-chamber, a plunger working in said solder-chamber for forcing the solder through said slot into contact with the seam of the can-body, and a conveyer for said can-body whereby the can-body is held stationary while the solder is being applied thereto and is then moved, substantially as set forth.

7. In a can-soldering machine, the combination of a support for the can-body, a soldering-iron provided with a solder-chamber, a slot communicating with said solder-chamber, and an inlet-opening for the solder connecting with said solder-chamber, a reciprocating plunger in said solder-chamber for forcing the solder through said slot into contact with the seam of the can-body, a conveyer for the can-body, and operating means for said plunger so timed with respect to said conveyer that the solder is forced against the can-body while the same is stationary, substantially as set forth.

8. In a can-soldering machine, the combination with a support for the can-body, a solder-receptacle, a soldering-iron arranged beneath said support in said solder-receptacle and having a solder-chamber, a slot communicating with said solder-chamber, and an inlet-opening for the solder connecting with said solder-chamber, a plunger in said solder-chamber for forcing the solder through said slot into contact with the seam of the can-body, and operating means for said plunger including a yielding connection, substantially as set forth.

Witness my hand this 13th day of April, 1903.

WILLIAM CAMERON.

Witnesses:
    LELAND A. BABCOCK,
    GEORGE C. EDWARDS.